United States Patent
Duong et al.

(10) Patent No.: US 11,136,993 B2
(45) Date of Patent: Oct. 5, 2021

(54) DIFFUSER PIPE WITH ASYMMETRY

(71) Applicant: PRATT & WHITNEY CANADA CORP., Longueuil (CA)

(72) Inventors: Hien Duong, Mississauga (CA); Peter Townsend, Mississauga (CA); Jason Nichols, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 261 days.

(21) Appl. No.: 16/374,046

(22) Filed: Apr. 3, 2019

(65) Prior Publication Data
US 2020/0318649 A1   Oct. 8, 2020

(51) Int. Cl.
*F04D 29/44* (2006.01)

(52) U.S. Cl.
CPC ........ *F04D 29/444* (2013.01); *F05D 2250/52* (2013.01)

(58) Field of Classification Search
CPC ........ F04D 17/10; F04D 29/44; F04D 29/441; F04D 29/444; F04D 29/667; F05D 2220/32; F05D 2240/128; F05D 2250/667; F05D 2260/60
See application file for complete search history.

(56) References Cited

U.S. PATENT DOCUMENTS

| | | |
|---|---|---|
| 6,471,475 B1 | 10/2002 | Sasu et al. |
| 6,589,015 B1 * | 7/2003 | Roberts ................. F04D 29/441 415/208.3 |
| 8,596,968 B2 | 12/2013 | Emmerson |
| 9,512,733 B2 | 12/2016 | Lombard et al. |
| 9,915,270 B2 | 3/2018 | Fraser et al. |
| 9,926,942 B2 | 3/2018 | Duong et al. |
| 2018/0258950 A1 | 9/2018 | Japikse |
| 2018/0306203 A1 | 10/2018 | Nasir et al. |
| 2018/0328381 A1 | 11/2018 | Parker et al. |
| 2019/0293087 A1 * | 9/2019 | Tamada ................. F04D 29/441 |
| 2019/0316600 A1 * | 10/2019 | Duong ..................... F02K 3/06 |
| 2020/0049161 A1 * | 2/2020 | Theratil .................. F02C 3/08 |
| 2020/0378303 A1 * | 12/2020 | Nichols ................... F02C 6/06 |

* cited by examiner

*Primary Examiner* — Courtney D Heinle
*Assistant Examiner* — Sang K Kim
(74) *Attorney, Agent, or Firm* — Norton Rose Fulbright Canada LLP

(57) ABSTRACT

A compressor diffuser for a gas turbine engine is described which includes diffuser pipes having a tubular body defining a pipe center axis extending therethrough. The tubular body includes a first portion extending in a generally radial direction, a second portion extending in a generally axial direction and terminating at a pipe outlet, and a bend portion fluidly linking the first portion and the second portion. A first curved side wall of the tubular body along the second portion is shorter than a second curved side wall of the tubular body along the second portion. The second portion of the tubular body has a cross-sectional profile defined in a plane normal to the pipe center axis. The first curved side wall of the cross-sectional profile has a smaller radius than a radius of the second curved side wall of the cross-sectional profile.

20 Claims, 5 Drawing Sheets

DIFFUSER PIPE WITH ASYMMETRY

TECHNICAL FIELD

The application relates generally to gas turbine engines and, more particularly, to compressor diffusers therefor.

BACKGROUND

Diffuser pipes are provided in certain gas turbine engines for diffusing a flow of high speed air received from an impeller of a centrifugal compressor and directing the flow to a downstream component, such as an annular chamber containing the combustor. The diffuser pipes are typically circumferentially arranged at a periphery of the impeller, and are designed to transform kinetic energy of the flow into pressure energy. Diffuser pipes seek to provide a uniform exit flow with minimal distortion, as it is preferable for flame stability, low combustor loss, reduced hot spots etc.

Diffuser pipes having a "fish-tail" type geometry are known, wherein the flow enters in a radial direction and is re-directed through a bend before exiting the diffuser pipes in an axial direction. However, as the flow within the diffuser pipes is turned from a radial to an axial direction, the flow is subjected to pressure gradients in a high curvature region. Pressure losses may be particularly significant near/at the 90 degree bend of the diffuser pipes.

SUMMARY

There is provided a compressor diffuser for a gas turbine engine, the compressor diffuser comprising: diffuser pipes having a tubular body defining a pipe center axis extending therethrough, the tubular body including a first portion extending in a generally radial direction, a second portion extending in a generally axial direction and terminating at a pipe outlet, and a bend portion fluidly linking the first portion and the second portion, a first curved side wall of the tubular body along the second portion being shorter than a second curved side wall of the tubular body along the second portion, the second portion of the tubular body having a cross-sectional profile defined in a plane normal to the pipe center axis, the first curved side wall of the cross-sectional profile having a smaller radius in the plane than a radius of the second curved side wall of the cross-sectional profile in the plane.

There is provided a centrifugal compressor, comprising: an impeller having an inner hub with a plurality of vanes extending therefrom, the impeller being rotatable within an outer shroud about a center axis, the impeller having a radial impeller outlet; and a diffuser with diffuser pipes having a tubular body defining a pipe center axis extending therethrough, the tubular body including a first portion extending in a generally radial direction and disposed adjacent the radial impeller outlet, a second portion extending in a generally axial direction and terminating at a pipe outlet, and a bend portion fluidly linking the first portion and the second portion, the second portion of the tubular body having a cross-sectional profile defined in a profile plane normal to the pipe center axis, the cross-sectional profile being at least partially defined by opposed first and second curved side walls, the first curved side wall having a first radius of curvature less than a second radius of curvature of the second curved side wall.

There is provided a method for optimizing pressure of a fluid flow through diffuser pipes in a compressor, comprising: conveying the fluid flow through a bend portion of the diffuser pipes while diffusing the fluid flow, and conveying the fluid flow through a portion of the diffuser pipes downstream of the bend portion to flow along a first curved side wall of the portion that has a smaller radius than a radius of a second curved side wall of the portion.

BRIEF DESCRIPTION OF THE DRAWINGS

Reference is now made to the accompanying figures in which.

DETAILED DESCRIPTION

Figure 1:
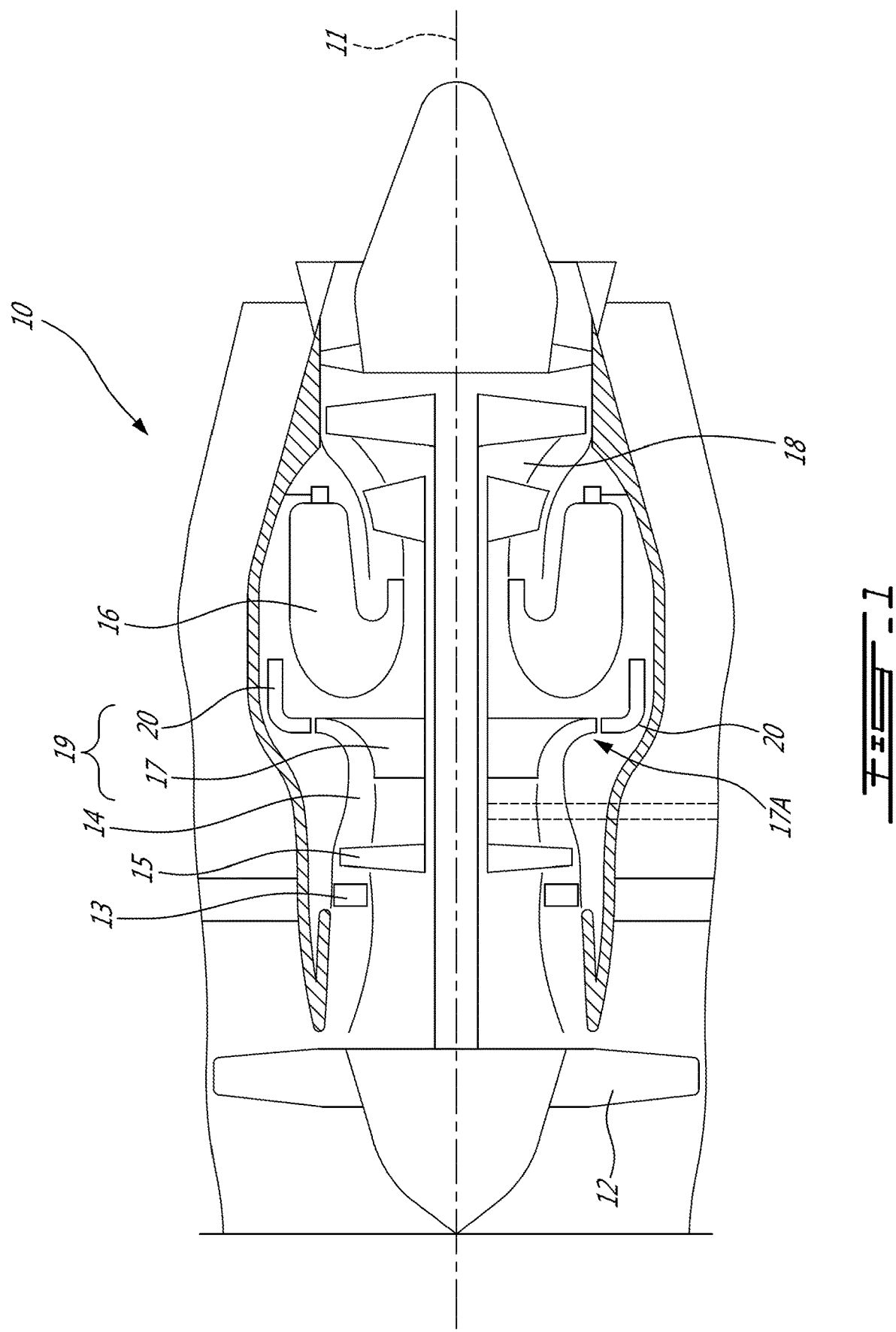
FIG. 1 is a cross-sectional view of a gas turbine engine.

FIG. 1 illustrates a gas turbine engine 10 of a type preferably provided for use in subsonic flight, generally comprising in serial flow communication along an engine center axis 11 a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14 may include a plurality of stators 13 and rotors 15 (only one stator 13 and rotor 15 being shown in FIG. 1), and it may include a centrifugal compressor 19.

The centrifugal compressor 19 of the compressor section 14 includes an impeller 17 and a plurality of diffuser pipes 20, which are located downstream of the impeller 17 and circumferentially disposed about a periphery of a radial outlet 17A of the impeller 17. The diffuser pipes 20 convert high kinetic energy at the impeller 17 exit to static pressure by slowing down fluid flow exiting the impeller. The diffuser pipes 20 may also redirect the air flow from a radial orientation to an axial orientation (i.e. aligned with the engine axis 11). In most cases, the Mach number of the flow entering the diffuser pipe 20 may be at or near sonic, while the Mach number exiting the diffuser pipe 20 may be less than 0.25 to enable stable air/fuel mixing, and light/re-light in the combustor 16.

Figure 2:
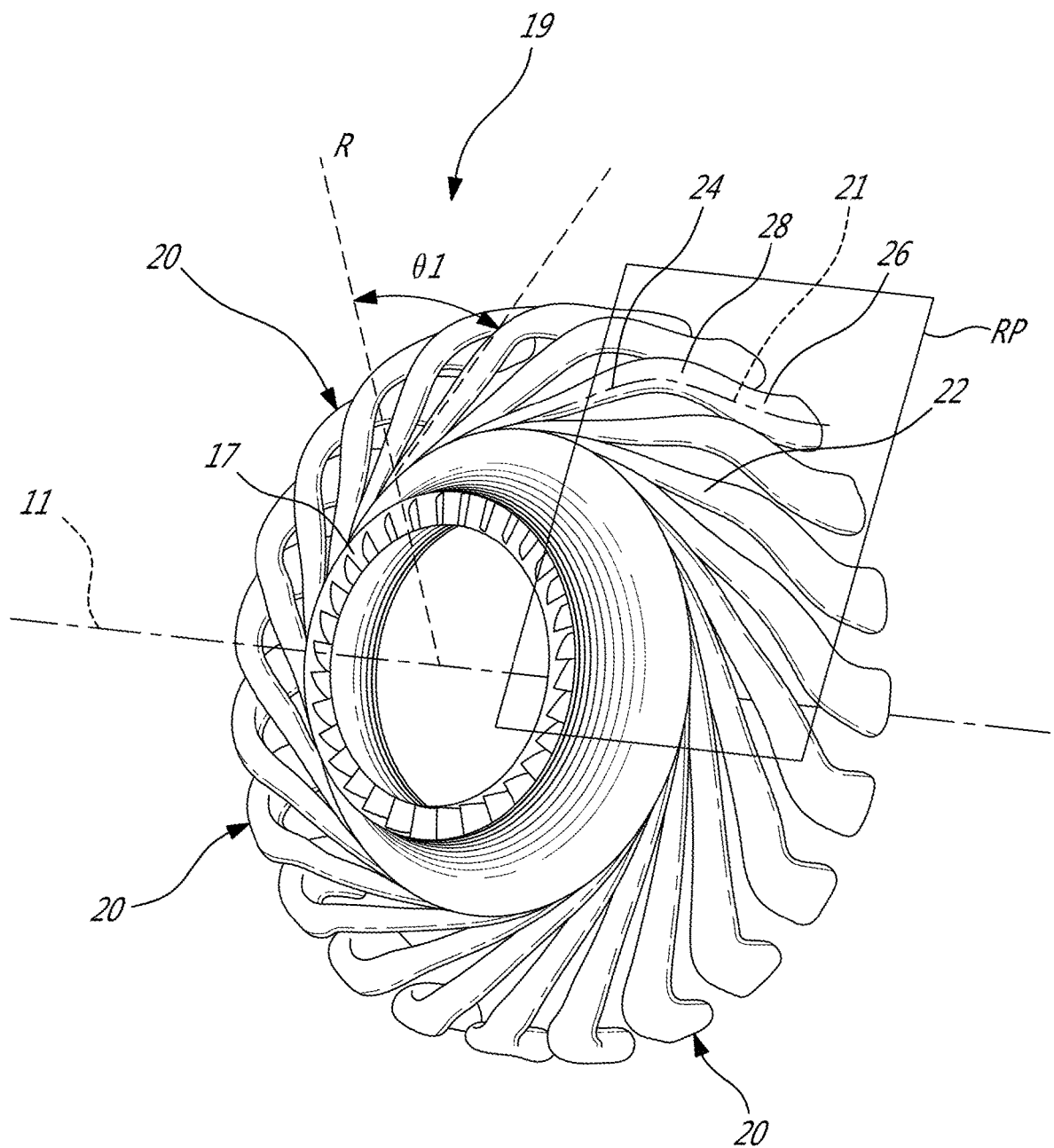
FIG. 2 is a perspective view of an impeller and diffuser pipes of a centrifugal compressor of the gas turbine of FIG. 1.

FIG. 2 shows the impeller 17 and the plurality of diffuser pipes 20, also referred to as "fishtail diffuser pipes", of the centrifugal compressor 19. Each of the diffuser pipes 20 includes a diverging (in a downstream direction) tubular body 22, formed, in one embodiment, of sheet metal. The enclosed tubular body 22 defines a flow passage 29 extending the length of the diffuser pipe 20 through which the compressed fluid flow is conveyed. The tubular body 22 includes a first portion 24 extending generally tangentially from the periphery and radial outlet 17A of the impeller 17. An open end is provided at an upstream end of the tubular body 22 and forms an inlet 23 (see FIG. 3) of the diffuser pipe 20. The first portion 24 is inclined at an angle θ1 relative to a radial axis R extending from the engine axis 11. The angle θ1 may be at least partially tangential, or even substantially tangentially, and may further correspond to a direction of fluid flow at the exit of the blades of the impeller 17, such as to facilitate transition of the flow from the impeller 17 to the diffuser pipes 20. The first portion 24 of the tubular body 22 can alternatively extend more substantially along the radial axis R.

The tubular body 22 of the diffuser pipes 20 also includes a second portion 26, which is disposed generally axially and is connected to the first portion 24 by an out-of-plane curved or bend portion 28. An open end at the downstream end of the second portion 26 forms an outlet 25 (see FIG. 3) of the diffuser pipe 20. Preferably, but not necessarily, the first portion 24 and the second portion 26 of the diffuser pipes 20 are integrally formed together and extend substantially uninterrupted between each other, via the curved, bend portion 28.

The large radial velocity component of the flow exiting the impeller 17, and therefore entering the first portion 24 of each of the diffuser pipes 20, may be removed by shaping the diffuser pipe 20 with the bend portion 28, such that the flow is redirected axially through the second portion 26 before exiting via the outlet 25 to the combustor 16. It will thus be appreciated that the flow exiting the impeller 17 enters the inlet 23 and the upstream first portion 24 and flows along a generally radial first direction. At the outlet of the first portion 24, the flow enters the bend portion 28 which functions to turn the flow from a substantially radial direction to a substantially axial direction. The bend portion 28 may form a 90 degree bend. At the outlet of the bend portion 28, the flow enters the downstream second portion 26 and flows along a substantially axial second direction different from the generally radial first direction. By "generally radial", it is understood that the flow may have axial, radial, and/or circumferential velocity components, but that the axial and circumferential velocity components are much smaller in magnitude than the radial velocity component. Similarly, by "generally axial", it is understood that the flow may have axial, radial, and/or circumferential velocity components, but that the radial and circumferential velocity components are much smaller in magnitude than the axial velocity component.

Figure 3:
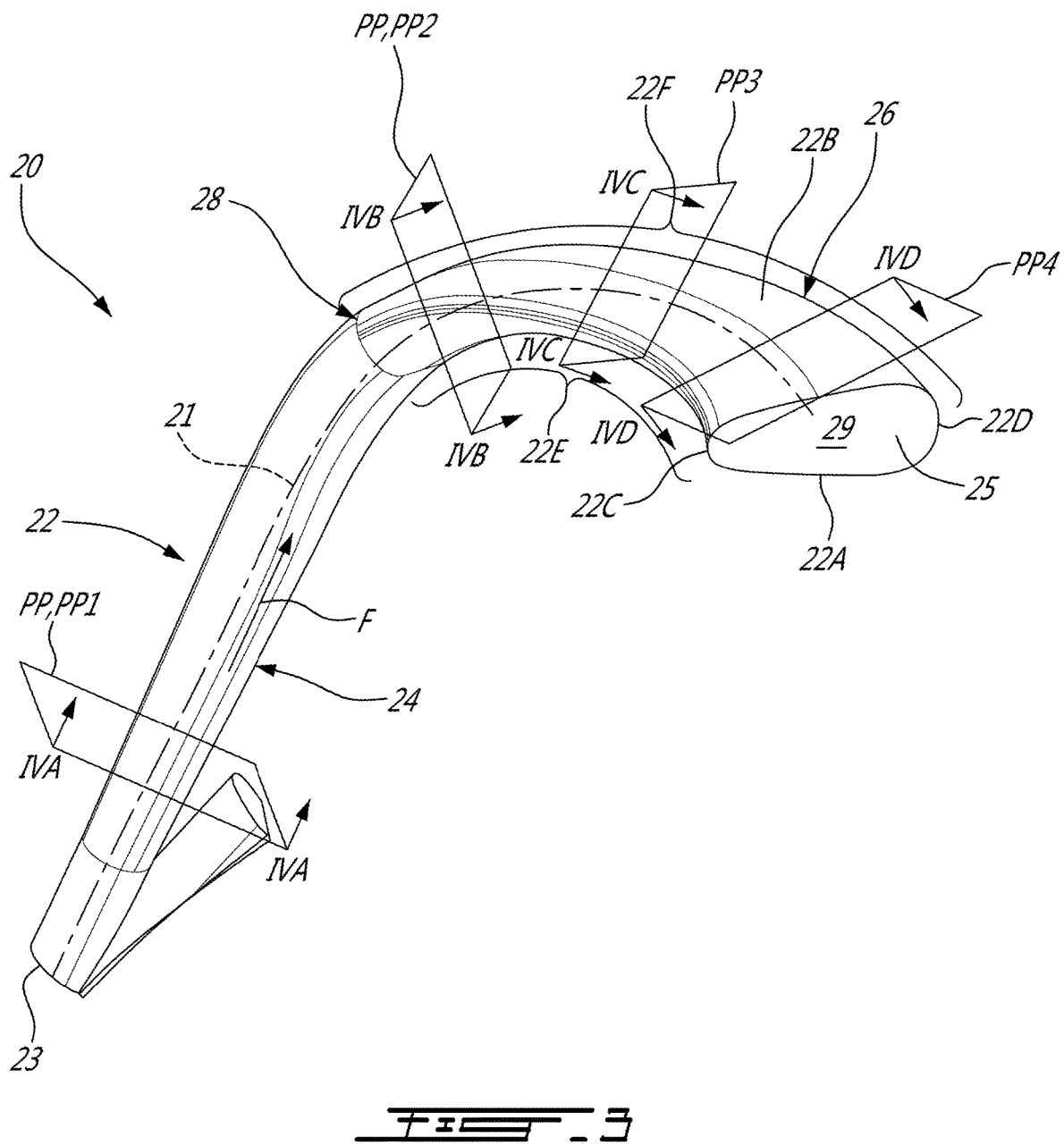
FIG. 3 is a perspective view of one of the diffuser pipes of FIG. 2.

Referring now to FIG. 3, the tubular body 22 of each diffuser pipe 20 has a radially inner wall 22A and a radially outer wall 22B. The tubular body 22 also has a first side wall 22C spaced circumferentially apart across the flow passage 29 from a second side wall 22D. The radially inner and outer walls 22A,22B and the first and second side walls 22C,22D meet and are connected to form the enclosed flow passage 29 extending through the length of the tubular body 22. The radially inner wall 22A corresponds to the wall of the tubular body 22 that has the smallest turning radius at the bend portion 28, and the radially outer wall 22B corresponds to the wall of the tubular body 22 that has the largest turning radius at the curved portion 28.

The tubular body 22 diverges in the direction of fluid flow F therethrough, in that the internal flow passage 29 defined within the tubular body 22 increases in cross-sectional area along its length which extends between the inlet 23 and the outlet 25 of the tubular body 22. This increase in cross-sectional area of the flow passage 29 through each diffuser pipe 20 may be continuous along the complete length of the tubular body 22, or the cross-sectional area of the flow passage 29 may increase in gradual increments along the length of the tubular body 22. In the depicted embodiment, the cross-sectional area of the flow passage 29 defined within the tubular body 22 increases gradually and continuously along its length, from the inlet 23 to the outlet 25. The direction of fluid flow F is along a pipe center axis 21 of the tubular body 22. The pipe center axis 21 extends through each of the first, second, and bend portions 24,26,28 and has the same orientation as these portions. The pipe center axis 21 is thus curved. In the depicted embodiment, the pipe center axis 21 is equidistantly spaced from the radially inner and outer walls 22A,22B of the tubular body 22, and from the first and second side walls 22C,22D, along the length of the tubular body 22.

The tubular body 22 is composed of many cross-sectional profiles 27 which are arranged or stacked one against another along the whole length of the tubular body 22. Each cross-sectional profile 27 is a plane figure that lies in its own profile plane PP, and each profile plane PP is transverse or normal to the pipe center axis 21. FIG. 3 shows four profile planes PP1,PP2,PP3,PP4 having the four cross-sectional profiles 27i,27ii,27iii,27iv shown in FIGS. 4A to 4D. It will be appreciated that many more of the profile planes PP and cross-sectional profiles 27 may be defined, at other locations along the length of the pipe center axis 21. In the depicted embodiment, the orientation of the profile planes PP in the frame of reference of the diffuser pipe 20 may vary over the length of the tubular body 22, depending on where the profile planes PP are located along the pipe center axis 21. Each cross-sectional profile 27 defines the shape, contour, or outline of the tubular body 22 at a specific location along the pipe center axis 21.

The shape of the cross-sectional profiles 27 may also be viewed or assessed relative to a reference plane RP. One possible reference plane RP is shown in FIG. 2, and extends through, or contains, the pipe center axis 21 of each tubular body 22 at some point along the pipe center axis 21. Multiple reference planes RP having different orientations in the frame of reference of the engine 10 may be present for each diffuser pipe 20. In an embodiment, and as shown in FIGS. 4A to 4D, the reference plane RP extends through, or contains, the pipe center axis 21 of each tubular body 22, and has a vertical orientation in each cross-sectional profile 27. In an embodiment, and as shown in FIGS. 4A to 4D, the reference plane RP extends through, or contains, the pipe center axis 21 and is normal to the profile plane PP at the same location of the profile plane PP on the pipe center axis 21. In FIGS. 4A to 4D, the reference plane RP extends into and out of the page. In FIGS. 4A to 4D, the reference plane RP extends between, and is transverse to, the radially inner and outer walls 22A,22B.

Referring to FIGS. 4A to 4D, and as described in greater detail below, the cross-sectional profiles 27 vary over the length of the tubular body 22. The cross-sectional profiles 27 are different over the length of the tubular body 22. Each cross-sectional profile 27 may be unique, and thus different from the other cross-sectional profiles 27. At least some of the cross-sectional profiles 27 are asymmetric about the reference plane RP.

More particularly, one or more of the cross-sectional profiles 27 of the tubular body 22 in at least the axially-oriented, downstream second portion 26 of the tubular body 22 are asymmetric about the reference plane RP. In FIG. 3, all of the cross-sectional profiles 27 of the tubular body 22 along the entire length of the second portion 26 are asymmetric about the reference plane RP. Two of the many possible cross-section profiles 27*iii*,27*iv* along the second portion 26 are shown in FIGS. 4C and 4D, which show the cross-sectional profiles 27*iii*,27*iv* lying respectively in profile planes PP3,PP4. As can be seen, the cross-sectional profiles 27*iii*,27*iv* are asymmetric about the reference plane RP. The shape or contour of the cross-sectional profiles 27*iii*,27*iv* is different on each side of the reference plane RP. Referring to FIG. 4B, the cross-sectional profiles 27*ii* of the tubular body 22 in or near the vicinity of the bend portion 28 are also asymmetric about the reference plane RP. FIG. 4B shows the cross-sectional profile 27*ii* lying in the profile plane PP2. The asymmetry of the cross-sectional profiles 27 of the tubular body 22 may take different forms, as described in greater detail below. The diffuser pipe 20 of FIG. 3 therefore has an asymmetric cross-sectional shape starting at, or in the vicinity of, the bend portion 28 and through the second portion 26 to the outlet 25 of the diffuser pipe 20. At least some of the diffuser pipes 20 of the centrifugal compressor 19 thus have cross-sectional profiles 27 or outlines at their downstream ends that are not symmetrical, where the downstream ends begin at some point at/near the bend portion 28 and extends to the outlets 25 of the diffuser pipes 20.

In FIGS. 4B to 4D, the asymmetrical shapes of the cross-sectional profiles 27*ii*,27*iii*,27*iv* are not oblong, where an oblong shape is an elongated rectangle or oval with parallel sides. The asymmetrical shapes of the cross-sectional profiles 27*ii*,27*iii*,27*iv* are not oval. The asymmetrical shapes of the cross-sectional profiles 27*ii*,27*iii*,27*iv* are different from a shape defined by two semi-circles with the same radius spaced apart and interconnected by parallel lines. The asymmetrical shapes of the cross-sectional profiles 27*ii*,27*iii*,27*iv* have transverse lines represented by the radially inner and outer walls 22A,22B. The asymmetrical shapes of the cross-sectional profiles 27*ii*,27*iii*,27*iv* are free of parallel lines. Some conventional pipes, in contrast, have oblong and symmetrical cross-sectional shapes along the downstream region of the diffuser pipe.

Such a non-oblong shape for the cross-sectional profiles 27 of the second and bend portions 26,28 of the tubular body 22 may help to manipulate the pressure gradient, and allow for better optimization of pipe pressure in circumferential and in flow wise directions. In some conventional pipes having oblong cross-sectional shapes, the combination of large flow diffusion, a significant bend in the pipe (e.g. 90 degrees) and circumferential momentum removal from the flow, can all result in flow separation which leads to diffuser losses. The non-oblong shapes are employed near the bend portion 28 and may help to vary pressure in a circumferential direction. This may affect upstream flow approaching the bend portion 28 and expose it to different circumferential pressure gradients, such that the flow may be redirected to more favorable regions of the diffuser pipe 20.

Some of the possible shapes for the asymmetrical cross-sectional profiles 27 are now described in greater detail.

Referring to FIGS. 4B to 4D, the radially inner and outer walls 22A,22B and the first and second side walls 22C,22D of the tubular body 22 define part of the asymmetric cross-sectional profiles 27*ii*,27*iii*,27*iv*. A height H of the tubular body 22 is defined between the radially inner and outer walls 22A,22B (see FIG. 4C). A width W of the tubular body 22 is defined between the first and second side walls 22C,22D. The height H of the tubular body 22 varies between the first and second side walls 22C,22D. The height H on one side of the reference plane RP is different from the height H on the other side of the reference plane RP. In FIG. 4C, the height H of the tubular body 22 adjacent to the first side wall 22C is less than the height H of the tubular body 22 adjacent to the second side wall 22D.

Referring to FIGS. 4B to 4D, and more particularly to FIG. 4B, the first and second side walls 22C,22D are curved. The first and second side walls 22C,22D have a concave curvature. The first side wall 22C has a first radius of curvature R1, and the second side wall 22D has a second radius of curvature R2 that is greater than the first radius of curvature R1. This provides a specific asymmetric shape to the cross-sectional profile 27 along at least the second portion 26. The shapes of the asymmetric cross-sectional profiles 27*ii*,27*iii*,27*iv* in FIGS. 4B to 4D are thus defined by the radially inner and outer walls 22A,22B being straight (i.e. free of curvature or zero curvature) and being transverse to each other (i.e. not parallel). The transverse radially inner and outer walls 22A,22B are connected at their ends to the curved and semi-circular first and second side walls 22D, 22C, which have different radii of curvature R1,R2. The radially inner and outer walls 22A,22B are tangential at their ends to the curved and semi-circular first and second side walls 22D,22C.

Figure 5A:
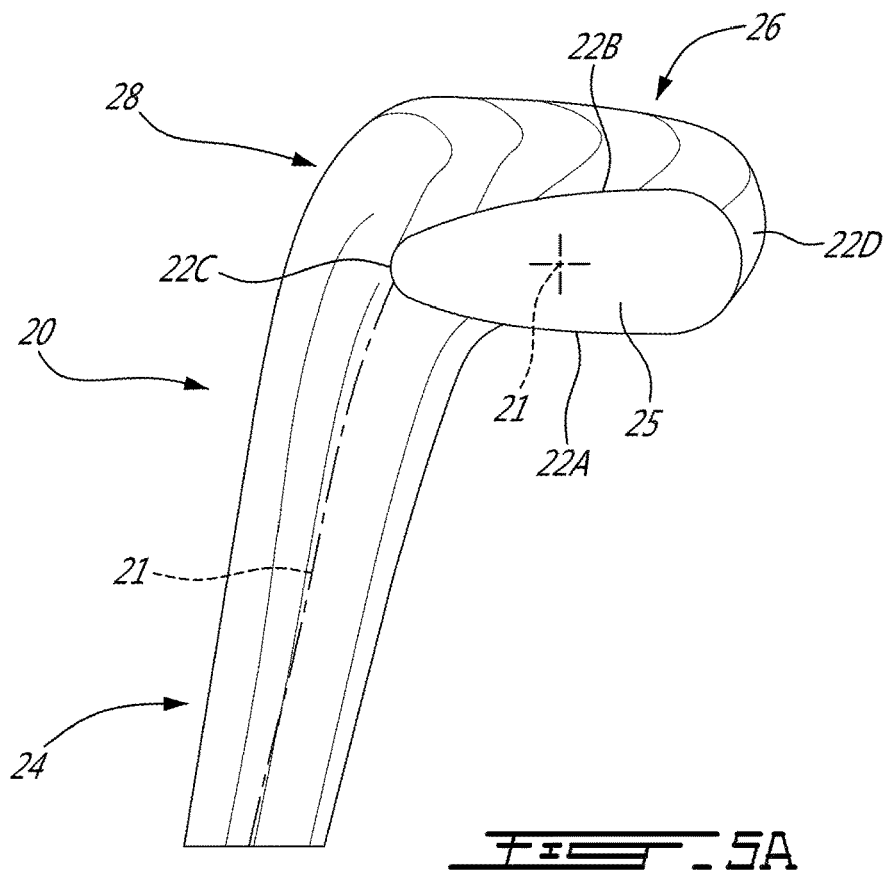
FIG. 5A an end view of one of the diffuser pipes of FIG. 2.
Figure 5B:
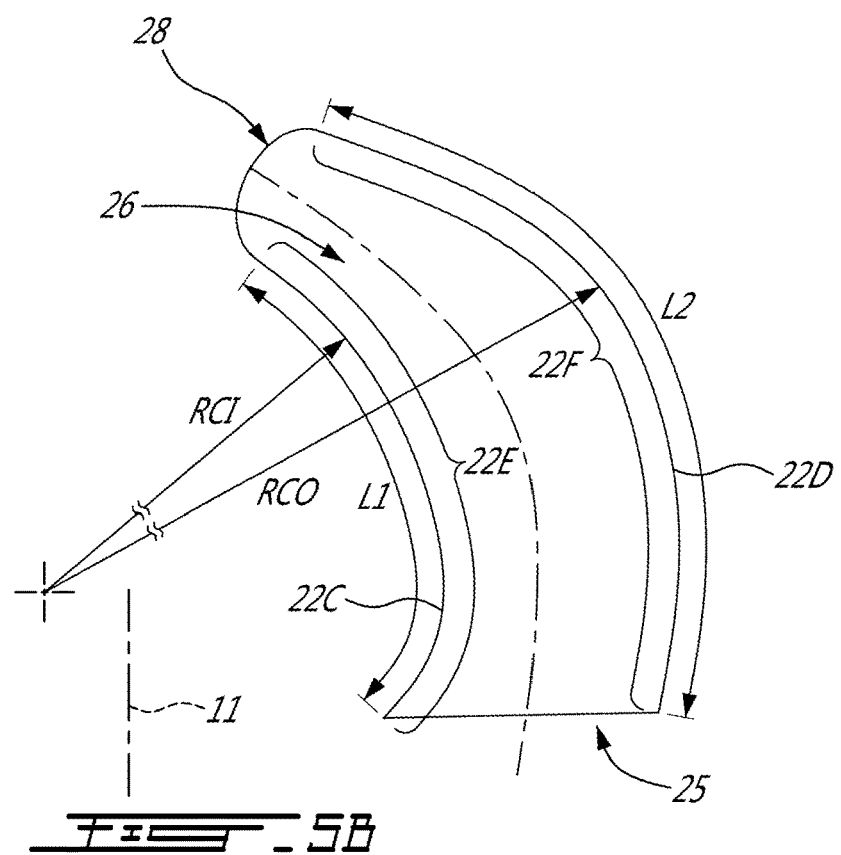
FIG. 5B is a top view of one of the diffuser pipes of FIG. 2.

The asymmetric cross-sectional profiles 27*ii*,27*iii*,27*iv* at the downstream end of the diffuser pipe 20 are thus "pinched" or narrower on one side of the diffuser pipe 20 compared to the other side of the diffuser pipe 20. In the depicted embodiment, the diffuser pipe 20 has the smaller first radius of curvature R1, and is thus pinched or narrower, on an inner curved section 22E of the tubular body 22 which extends along the first side wall 22C (see FIGS. 3, 5A and 5B), beginning at or near the bend portion 28 and through the second portion 26. An outer curved section 22F of the second portion 26 is circumferentially spaced apart from the inner curved section 22E. The outer curved section 22E extends along the second side wall 22D beginning at or near the bend portion 28 and through the second portion 26 (see FIGS. 3, 5A and 5B). The inner curved section 22E has a radius of curvature RCI that is smaller than a radius of curvature RCO of the outer curved section 22F. As shown in FIG. 5B, the inner and outer curved sections 22E,22F are such that the second portion 26 turns circumferentially toward the engine center axis 11, to convey flow from the outlet 25 along a substantially axial direction, and to help remove swirl from the flow. Pinching or reducing the height of the diffuser pipe 20 along the inner curved section 22E may help the flow to negotiate the inner curved section 22E and inner radius of the diffuser pipe 20 at or near the bend portion 28.

As shown in FIG. 5B, the pipe center axis 21, and thus the diffuser pipe 20, is curved along the second portion 26 and has a curvature being substantially parallel to that of the inner and outer curved sections 22E,22F. A length L1 of the first side wall 22C along the inner curved section 22E of the second portion 26, where the length is measured along the curved pipe center axis 21, is less than a length L2 of second side wall 22D along the outer curved section 22F of the second portion 26. At least the second portion 22 tubular body 22 thus has a "pinched", "narrower", or smaller height along its shorter, inner curved section 22E.

Referring to FIGS. 4B to 4D, each of the asymmetric cross-sectional profiles 27*ii*,27*iii*,27*iv* has an area which increases over the length of the tubular body 22 in the direction of the outlet 25, as can be seen by comparing FIGS. 4B to 4D. This is consistent with the diverging flow passage 29 defined by the tubular body 22. Despite the asymmetric cross-sectional profiles 27ii,27iii,27iv having increased dimensions and thus increased areas over the length of the tubular body 22 in the direction of the outlet 25, the asymmetric cross-sectional profiles 27ii,27iii,27iv maintain a constant or common asymmetric shape. Thus, although the diffuser pipe 20 diverges by increasing in cross-sectional area from at least the bend portion 28 to the outlet 25, the outer perimeter or profile in cross-section of the diffuser pipe 20 remains the same. Stated differently, the dimensions of the asymmetric cross-sectional profiles 27 will change, but their proportions will remain the same such that their shape remains constant. In FIGS. 4B to 4D, the center of area CA of each of the asymmetric cross-sectional profiles 27ii,27iii, 27iv is closer to the second side wall 22D than to the first side wall 22C.

The area of the asymmetric cross-sectional profiles 27ii, 27iii,27iv may be the same as that of a symmetric cross-sectional profile 27' at the same location along the pipe center axis 21. Referring to FIG. 4D, the asymmetric cross-sectional profile 27iv of the second portion 26 has an area that is equal to the area of the cross-sectional profile 27' that is symmetric about the reference plane RP, and that is located at the same location along the pipe center axis 21 as the asymmetric cross-sectional profile 27iv. Thus, the cross-sectional shape of downstream sections of the diffuser pipe 20 are asymmetrical, but have the same cross-sectional area as a conventional diffuser pipe 20 with a symmetrical downstream section. It can thus be appreciated that the cross-sectional area of the diffuser pipe 20 is not changed compared to a conventional diffuser pipe, just its shape. The cross-sectional width W of the diffuser pipe 20 may also remain the same as the cross-sectional width of a conventional diffuser pipe.

Figure 4A:
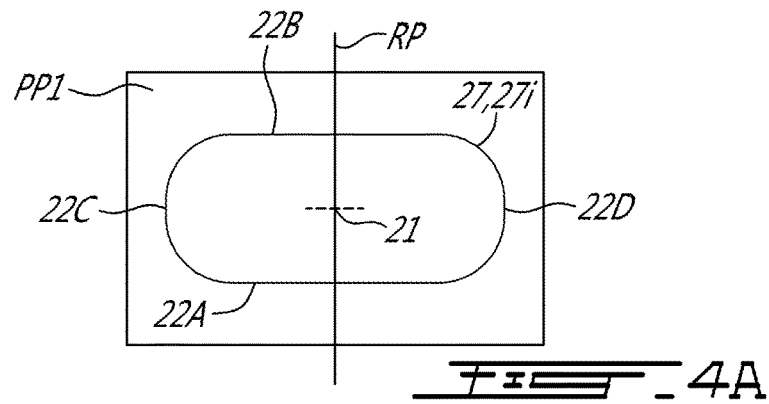
FIG. 4A is a view of a cross-sectional profile of the diffuser pipe of FIG. 3, taken along the line IVA-IVA in FIG. 3.
Figure 4B:
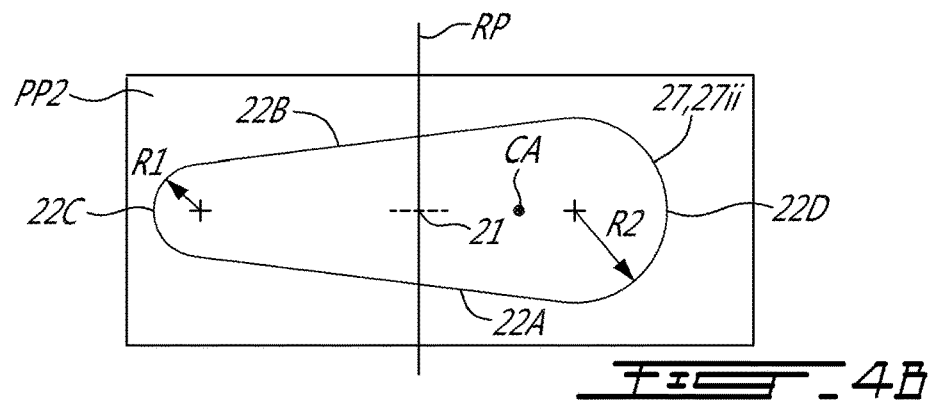
FIG. 4B is a view of another cross-sectional profile of the diffuser pipe of FIG. 3, taken along the line IVB-IVB in FIG. 3.
Figure 4C:
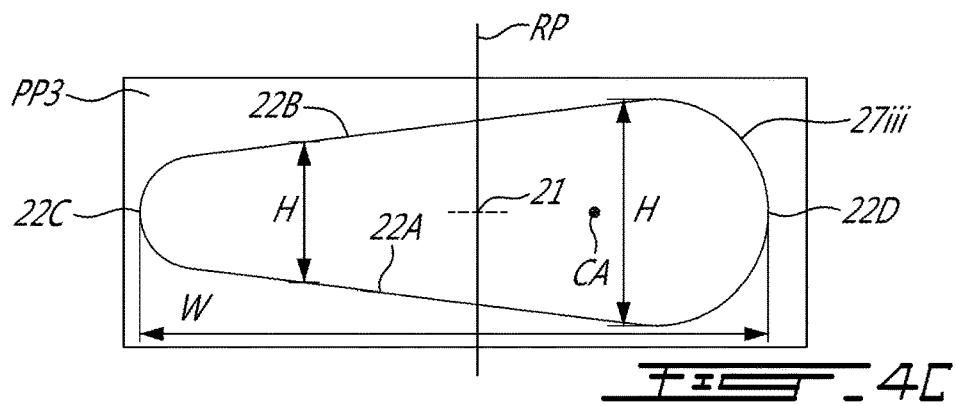
FIG. 4C is a view of another cross-sectional profile of the diffuser pipe of FIG. 3, taken along the line IVC-IVC in FIG. 3.
Figure 4D:
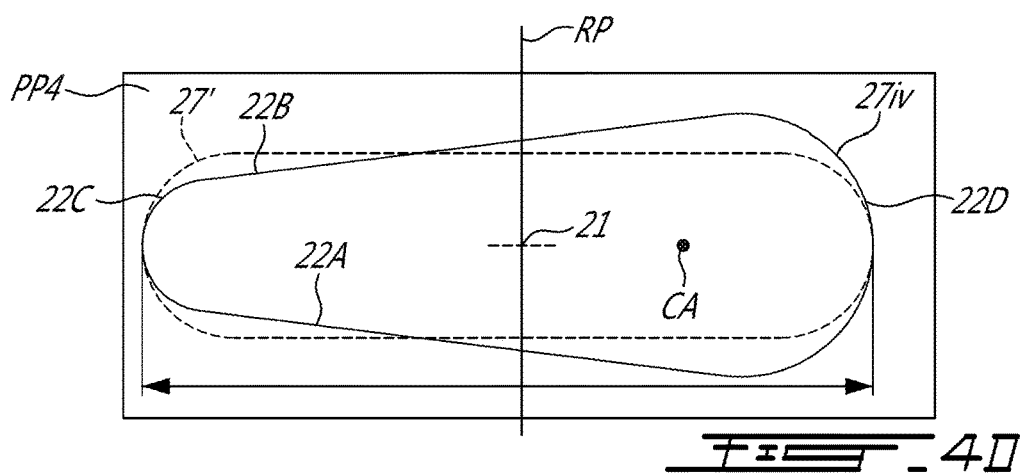
FIG. 4D is a view of another cross-sectional profile of the diffuser pipe of FIG. 3, taken along the line IVD-IVD in FIG. 3.

Referring to FIGS. 3 and 4A, the diffuser pipe 20 does not have asymmetric cross-sectional profiles 27 along its entire length. One or more of the cross-sectional profiles 27 along the radially-extending first portion 24 of the tubular body 22, such as the cross-sectional profile 27i in the profile plane PP1 shown in FIG. 4A, is symmetric about the reference plane RP. Thus, in the depicted embodiment, the upstream segments of the diffuser pipe 20 have symmetrical cross-sectional profiles 27, which may have oval, circular, or oblong shapes, for example.

The asymmetrical cross-sectional profiles 27 at downstream sections of the diffuser pipe 20, at various locations along the pipe center axis 21, help to increase the static pressure and reduce static pressure variation near the inner surfaces of the diffuser pipe 20, compared to a conventional diffuser pipe having symmetrical cross-sectional profiles.

Referring to FIGS. 2 and 3, there is also disclosed a method for optimizing pressure of a fluid flow through diffuser pipes 20. The method includes conveying the fluid flow through a bend portion 28 of the diverging diffuser pipes 20, and then through a portion 26 of the diffuser pipes 20 downstream of the bend portion 28 to flow along a first curved side wall 22C of the portion 26 that has a smaller radius than a radius of a second curved side wall 22D of the portion 26.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A compressor diffuser for a gas turbine engine, the compressor diffuser comprising: diffuser pipes having a tubular body defining a pipe center axis extending therethrough, the tubular body including a first portion extending in a generally radial direction, a second portion extending in a generally axial direction and terminating at a pipe outlet, and a bend portion fluidly linking the first portion and the second portion, a first curved side wall of the tubular body at least at the pipe outlet being shorter than a second curved side wall of the tubular body at least at the pipe outlet, the second portion of the tubular body having a cross-sectional profile at least at the pipe outlet defined in a plane normal to the pipe center axis, the first curved side wall of the cross-sectional profile having a smaller radius in the plane than a radius of the second curved side wall of the cross-sectional profile in the plane.

2. The compressor diffuser of claim 1, wherein the first portion of the tubular body has one or more cross-sectional profiles different from the cross-sectional profile of the second portion of the tubular body.

3. The compressor diffuser of claim 2, wherein the one or more cross-sectional profiles of the first portion of the tubular body are symmetric about reference planes extending through the pipe center axis and normal to the profile planes, the reference planes extending between radially inner and radially outer walls of the tubular body.

4. The compressor diffuser of claim 1, wherein cross-sectional profiles of the tubular body in at least part of the bend portion are asymmetric about reference planes extending through the pipe center axis and normal to the profile planes, the reference planes extending between radially inner and radially outer walls of the tubular body.

5. The compress diffuser of claim 4, wherein the first curved side wall of the cross-sectional profiles in said part of the bend portion has a smaller radius than a radius of the second curved side wall of the cross-sectional profiles in said part of the bend portion.

6. The compressor diffuser of claim 1, wherein an area of the cross-sectional profile along the second portion increases over a length of the second portion between the bend portion and the pipe outlet.

7. The compressor diffuser of claim 1, wherein a length of the second portion is defined from a downstream end of the bend portion to the pipe outlet, and along all of the length of the second portion:
   the first curved side wall is shorter than the second curved side wall; and
   the first curved side wall has a smaller radius than the radius of the second curved side wall in cross-sectional profiles in planes normal to the pipe center axis along all of the length of the second portion.

8. The compressor diffuser of claim 1, wherein a height of the second portion of the tubular body is measured between radially inner and radially outer walls of the tubular body, the radially inner and outer walls extending between the first and second curved side walls, the height of pipe decreasing in direction from the second curved side wall to the first curved side wall.

9. The compressor diffuser of claim 1, wherein the second portion of the tubular body comprises radially inner and radially outer walls extending in a straight line between the first and second curved side walls.

10. A centrifugal compressor, comprising:
   an impeller having an inner hub with a plurality of vanes extending therefrom, the impeller being rotatable within an outer shroud about a center axis, the impeller having a radial impeller outlet; and a diffuser with diffuser pipes having a tubular body defining a pipe center axis extending therethrough, the tubular body including a radially inner wall, a radially outer wall spaced radially outwardly from the radially inner wall, a first curved side wall extending between the radially inner and outer walls, and a second curved side wall extending between the radially inner and outer walls and spaced apart from the first curved side wall, the tubular body including a first portion extending in a generally radial direction and disposed adjacent the radial impeller outlet, a second portion extending in a generally axial direction and terminating at a pipe outlet, and a bend portion fluidly linking the first portion and the second portion, the second portion of the tubular body having a cross-sectional profile at least at the pipe outlet defined in a profile plane normal to the pipe center axis, the cross-sectional profile being at least partially defined by the first and second curved side walls, the first curved side wall having a first radius of curvature less than a second radius of curvature of the second curved side wall.

11. The centrifugal compressor of claim 10, wherein a height of the tubular body adjacent to the first curved side wall is less than the height of the tubular body adjacent to the second curved side wall.

12. The centrifugal diffuser of claim 10, wherein cross-sectional profiles of the tubular body in at least part of the bend portion are asymmetric about reference planes extending through the pipe center axis and normal to the profile planes, the reference planes extending between the radially inner and outer walls of the tubular body.

13. The centrifugal diffuser of claim 12, wherein the first curved side wall of the cross-sectional profiles in said part of the bend portion has a smaller radius than a radius of the second curved side wall of the cross-sectional profiles in said part of the bend portion.

14. The centrifugal diffuser of claim 10, wherein the first portion of the tubular body has one or more cross-sectional profiles different from the cross-sectional profile of the second portion of the tubular body.

15. The centrifugal diffuser of claim 14, wherein the one or more cross-sectional profiles of the first portion of the tubular body are symmetric about reference planes extending through the pipe center axis and normal to the profile planes, the reference planes extending between the radially inner and outer walls of the tubular body.

16. The centrifugal compressor of claim 10, wherein an area of the cross-sectional profile along the second portion increases over a length of the second portion between the bend portion and the pipe outlet.

17. The centrifugal compressor of claim 16, wherein the cross-sectional profile of the second portion has a common shape over the length of the second portion.

18. A centrifugal compressor, comprising:
an impeller having an inner hub with a plurality of vanes extending therefrom, the impeller being rotatable within an outer shroud about a center axis, the impeller having a radial impeller outlet; and
a diffuser with diffuser pipes having a tubular body defining a pipe center axis extending therethrough, the tubular body including a first portion extending in a generally radial direction and disposed adjacent the radial impeller outlet, a second portion extending in a generally axial direction and terminating at a pipe outlet, and a bend portion fluidly linking the first portion and the second portion, the second portion of the tubular body having a cross-sectional profile defined in a profile plane normal to the pipe center axis, the cross-sectional profile being at least partially defined by opposed first and second curved side walls, the first curved side wall having a first radius of curvature less than a second radius of curvature of the second curved side wall, the cross-sectional profile of the second portion has a first area equal to a second area of a second cross-sectional profile at a same location as said cross-sectional profile, the second cross-sectional profile being symmetric about a reference plane extending through the pipe center axis and normal to the profile plane, the reference plane extending between radially inner and radially outer walls of the tubular body.

19. The centrifugal compressor of claim 18, wherein the first curved side wall of the tubular body along the second portion is shorter than the second curved side wall of the tubular body along the second portion.

20. The centrifugal diffuser of claim 18, wherein cross-sectional profiles of the tubular body in at least part of the bend portion are asymmetric about reference planes extending through the pipe center axis and normal to the profile planes, the reference planes extending between radially inner and radially outer walls of the tubular body.

* * * * *